US011713275B2

(12) United States Patent
Schultheis et al.

(10) Patent No.: US 11,713,275 B2
(45) Date of Patent: Aug. 1, 2023

(54) CHALCOGENIDE COMPOSITIONS FOR OPTICAL FIBERS AND OTHER SYSTEMS

(71) Applicant: SCHOTT CORPORATION, Elmsford, NY (US)

(72) Inventors: Bernd Schultheis, Schwabenheim (DE); Nathan Carlie, Cherry Hill, NJ (US); Lothar Willmes, Oestrich-Winkel (DE); Simone Monika Ritter, Mainz (DE); Bernd Hoppe, Ingelheim (DE); William James, Clarks Summit, PA (US)

(73) Assignee: SCHOTT CORPORATION, Elmsford, NY (US)

( * ) Notice: Subject to any disclaimer, the term of this patent is extended or adjusted under 35 U.S.C. 154(b) by 981 days.

(21) Appl. No.: 16/439,076

(22) Filed: Jun. 12, 2019

(65) Prior Publication Data
US 2019/0292094 A1   Sep. 26, 2019

Related U.S. Application Data

(63) Continuation of application No. PCT/US2017/066760, filed on Dec. 15, 2017.

(60) Provisional application No. 62/435,234, filed on Dec. 16, 2016.

(51) Int. Cl.
*C03C 13/04* (2006.01)
*C03C 3/32* (2006.01)
*C03C 4/10* (2006.01)

(52) U.S. Cl.
CPC .............. *C03C 13/044* (2013.01); *C03C 3/32* (2013.01); *C03C 3/321* (2013.01); *C03C 3/323* (2013.01); *C03C 4/10* (2013.01); *C03C 13/043* (2013.01); *C03C 2204/00* (2013.01); *C03C 2213/00* (2013.01)

(58) Field of Classification Search
CPC ......... C03C 3/321; C03C 3/32; C03C 13/043; C03C 13/044; C03C 4/10; C03C 2204/00; C03C 2213/00; C03C 3/323
See application file for complete search history.

(56) References Cited

U.S. PATENT DOCUMENTS

| | | | |
|---|---|---|---|
| 5,392,376 A * | 2/1995 | Aitken | C03C 13/043 |
| | | | 501/40 |
| RE36,513 E | 1/2000 | Aitken | |
| 6,015,765 A * | 1/2000 | Harbison | C03C 3/323 |
| | | | 501/40 |
| 6,128,429 A | 10/2000 | Cole | |
| 7,197,899 B2 | 4/2007 | Mossadegh | |
| 2005/0066689 A1 | 3/2005 | Eis | |
| 2005/0259944 A1 | 11/2005 | Anderson | |
| 2005/0274149 A1 | 12/2005 | Hoppe | |
| 2006/0201206 A1 | 9/2006 | Benoit | |
| 2007/0147752 A1 | 6/2007 | Weisberg | |
| 2008/0141724 A1 * | 6/2008 | Fuflyigin | G02B 6/02304 |
| | | | 65/391 |
| 2009/0010286 A1 | 1/2009 | Messaddeq | |
| 2019/0292094 A1 * | 9/2019 | Schultheis | C03C 3/32 |

FOREIGN PATENT DOCUMENTS

| | | |
|---|---|---|
| CA | 2482105 | 3/2005 |
| CA | 2482285 | 3/2005 |
| CN | 1972878 | 5/2007 |
| DE | 10344207 | 12/2004 |
| DE | 10344205 | 5/2005 |
| RU | 1799852 | 3/1993 |
| RU | 2316497 | 2/2008 |
| RU | 2552590 | 6/2015 |
| SU | 1715725 | 2/1992 |
| WO | 9933758 | 7/1999 |

OTHER PUBLICATIONS

Abe et al., Preparation and properties of Ge—Ga—S glasses for laser hosts, 1997, Journal of Non-Crystalline Solids, 212, 143-150 (Year: 1997).*
Chen et al., Investigations of structure and nonlinear optical properties of gold doped germanium-gallium-sulfur chalcogenide glasses, 2015, Journal of Non-Crystalline Solids, 412, 30-34 (Year: 2015).*

(Continued)

*Primary Examiner* — Elizabeth A. Bolden
(74) *Attorney, Agent, or Firm* — Ruggiero McAllister & McMahon LLC

(57) ABSTRACT

The present disclosure relates to compositions that can be used for optical fibers and other systems that transmit light in the near-, mid- and/or far-ranges of the infrared spectrum, such as for example in the wavelength range of 1.5 μm to 14 μm. The optical fibers may comprise a light-transmitting chalcogenide core composition and a cladding composition. In some embodiments, the light-transmitting chalcogenide core composition has a refractive index n(core) and a coefficient of thermal expansion CTE(core), and the cladding composition has a refractive index n(cladding) and a coefficient of thermal expansion CTE(cladding), wherein n(cladding) is less than n(core) and in some embodiments wherein CTE(cladding) is less than CTE(core). In some embodiments, the chalcogenide glass core composition comprises a) sulfur and/or selenium, b) germanium, and c) gallium, indium, tin and/or one or more metal halides.

17 Claims, No Drawings

(56) References Cited

OTHER PUBLICATIONS

Dragic et al., A unified materials approach to mitigating optical nonlinearities in optical fiber. II. B. The optical fiber, material additivity and the nonlinear coefficients, 2018, International Journal of Applied Glass Science, 9, 307-318 (Year: 2018).*
Harrington, Infrared Fibers and Their Applications, 2004, SPIE—The International Society for Optical Engineering, i-xi and 83-104 (Year: 2004).*
Kobelke et al., Chalcogenide glass single mode fibers—preparation and properties, 1999, Journal of Non-Crystalline Solids, 256& 257, 226-231 (Year: 1999).*
Lexikon der Optik, pp. 213-214.

* cited by examiner

CHALCOGENIDE COMPOSITIONS FOR OPTICAL FIBERS AND OTHER SYSTEMS

CROSS REFERENCE TO RELATED APPLICATIONS

This application is a continuation of International Application No. PCT/US2017/066760 filed Dec. 15, 2017 that claims priority to U.S. Provisional Application No. 62/435,234 filed on Dec. 16, 2016.

BACKGROUND OF THE DISCLOSURE

1. Field of the Disclosure

The present disclosure relates to chalcogenide compositions for optical fibers and other systems.

2. Description of the Related Art

Glass fibers for transmitting light, as have been described many times, for example in Lexikon der Optik, pages 213-214, usually comprise a combination of two materials having a different refractive index, a relatively highly refractive light-transmitting core material which is sheathed/cladded in a material having a lower refractive index. In general, these are glass materials, with the glass material for the light-transmitting core glass being different from the glass material of the sheathing/cladding glass having a lower refractive index. The core and cladding compositions are usually specially adapted to reduce the likelihood of degradation and crystallization at the interface between the core and the cladding. Such structures enable light to be transmitted along the axis of the fiber in the core by means of total reflection at the interface between core and sheath/cladding, without light exiting outward through the sheath/cladding. Such fibers are referred to as stepped index fibers. The difference between the refractive indices of the core glass and cladding glass helps/hinders applications based on the resultant numerical aperture (NA). If the goal is to transmit as much light as possible regardless of light distribution and quality, a large difference of refractive index between core glass and cladding glass is generally desirable to generate a high NA (numerical aperture), in general larger than 0.2, which means a large acceptance angle of the coupling light, but this trends toward a multi-mode light transmission in the fiber. To get a highly sophisticated light transmission, for instance a mono-mode conduction of laser light by preserving the Gaussian light distribution intensity along the fiber, the NA has to be very small, for example in the range of 0.01-0.1, which means a difference in the refractive index between the core and the cladding would be in the range of <0.004.

In stepped index fibers, the core glass composition has to have a very high transparency for the desired wavelength of radiation to be transmitted so that the absorption losses in the fiber can be kept very low. For the transmission of $CO_2$ laser radiation, it is necessary to use a material which has a very high transmission in the laser wavelength range from, for example, 9 μm to 12 μm. The only known class of materials which is transparent enough in the wavelength range mentioned is the chalcogenides. Core-sheath/cladding fibers can be produced therefrom but these have a relatively high absorption of 5 dB/m, i.e. only 30% of the input radiation reaches the fiber outlet after a distance of 1 m.

SUMMARY OF THE DISCLOSURE

The present disclosure relates to compositions that can be used for optical fibers and other systems that transmit light in the near-, mid- and/or far-ranges of the infrared spectrum, such as for example in the wavelength ranges of 1.5 μm to 14 μm, 2.5 μm to 6 μm and 8 μm to 11 μm.

The optical fibers may comprise a light-transmitting chalcogenide core composition and a cladding composition. In some embodiments, the light-transmitting chalcogenide core composition has a refractive index n(core) and a coefficient of thermal expansion CTE(core), and the cladding composition has a refractive index n(cladding) and a coefficient of thermal expansion CTE(cladding), wherein n(cladding) is less than n(core), and in some embodiments wherein CTE(cladding) is less than CTE(core). In some embodiments, the chalcogenide glass core composition comprises a) sulfur and/or selenium, b) germanium, and c) gallium, indium, tin and/or one or more metal halides.

It is not possible to make a fiber from every known glass composition because not all glasses can be exposed to the temperatures required to draw the fibers without experiencing adverse effects (e.g., devitrification). Further, there are also practical and economical limits for some materials. In other words, some glasses have prohibitively high drawing temperatures and thus require special equipment. In other cases, the glass may require atmospheric control to prevent volatilization of constituents.

There are a number of instances in the literature of adequate infrared glasses for fibers, however their usefulness is limited as they cannot undergo thermal processing (e.g., fiber drawing or molding). The chalcogenide compositions of the current disclosure can be drawn into fibers because they are not prone to devitrification or phase separation.

Thus, in one embodiment, the present disclosure provides a glass fiber for transmitting infrared radiation comprising a chalcogenide glass core, the core having a chalcogenide glass core composition with a refractive index n(core) and a coefficient of thermal expansion CTE(core), and a cladding, the cladding having a cladding composition with a refractive index n(cladding) and a coefficient of thermal expansion CTE(cladding). The n(cladding) is less than the n(core). The core composition comprises: a) sulfur and/or selenium; b) germanium; and c) gallium, indium, tin and/or one or more metal halides.

DETAILED DESCRIPTION OF THE DISCLOSURE

The present disclosure relates to compositions that can be used for optical fibers and other systems that transmit light in the near-, mid- and/or far-ranges of the infrared spectrum, such as for example in the wavelength ranges of 1.5 μm to 14 μm, 2.5 μm to 6 μm and 8 μm to 11 μm.

The optical fibers may comprise a chalcogenide glass core having a light-transmitting chalcogenide core composition and a cladding having a cladding composition. In some embodiments, the light-transmitting chalcogenide core composition has a refractive index n(core) and a coefficient of thermal expansion CTE(core), and the cladding composition has a refractive index n(cladding) and a coefficient of thermal expansion CTE(cladding), wherein n(cladding) is less than n(core). In some embodiments, CTE(cladding) is less than CTE(core), which is particularly useful when the cladding is a chalcogenide glass composition of the current disclosure. The lower CTE(cladding) compresses the chalcogenide core to prevent the core from being damaged. When the cladding is a polymer of the current disclosure, the CTE(cladding) can, but is not required to be, less than the CTE(core).

In some embodiments, the chalcogenide glass core composition comprises a) sulfur and/or selenium, b) germanium, and c) gallium, indium, tin and/or one or more metal halides.

The glass compositions described herein can be used as the core, the cladding or both. The glass fibers can be manufactured according to techniques known in the art, such as for non-limiting example the techniques described in US 2005/0274149 and US 2005/0066689.

The refractive indices of the core and the cladding can be modified in any manner known to those skilled in the art. In some embodiments, one possible way to modify the refractive index in the core or the cladding is to increase or decrease the content of the components. For non-limiting example, an increase in the sulfur and/or selenium content typically reduces the refractive index and reduces the coefficient of thermal expansion.

A reduction in the refractive index is usually necessary for effective light transmission but a reduction in the coefficient of thermal expansion usually increases the compressive stress of the fiber and the bending stability. The fiber may be compressively stressed by wrapping the glass preform in a polymer with a similar glass transition temperature, for example polyether sulfone, which will protect the preform and the fiber from damage, will create a compressive stress in the glass due to the high coefficient of thermal expansion, and will prevent evaporation of the glass during drawing.

The fibers of the current disclosure should be able to withstand mechanical loads. If the fibers are excessively mechanically sensitive, it is easy for the fibers to break. One criterion for assessing the strength of a fiber is the so-called loop test. In this test, a tightened loop is formed from the fiber. The smaller the diameter of the loop at which the fiber breaks, the more the fiber is resistant to breakage.

Strong fibers can be produced by pretensioning the fibers which causes the coefficient of thermal expansion (CTE) of the chalcogenide glass core composition to be greater than the coefficient of thermal expansion of the cladding composition. Since the cladding composition may have a higher glass transition temperature relative to the core composition, the cladding composition may cool more quickly during drawing than the core composition. This produces a stress in the fiber that mechanically stabilizes the fiber. Such a prestressed fiber is generally substantially more fracture resistant than a non-prestressed fiber. Of course, other methods for introducing a stress are also possible. For example, the fiber can be chemically prestressed during the production process or thereafter by introducing ions into the cladding using known processes.

In some embodiments of the disclosure, the diameter of the chalcogenide glass core is 10 μm to 300 μm and the outer diameter of the fiber is 10.5 μm to 350 μm. However, other diameters and thicknesses are within the scope of the current disclosure since the suitable values are dictated in most cases by the application. For example, a large core diameter increases the transmission and a thin cladding thickness in some applications is beneficial, while in other applications a small core diameter and a very thick cladding are useful.

The fibers of the current disclosure may be used in fiber bundles alone or with other types of light-guiding fibers.

The principles of suitable fiber drawing processes are described for example in DE 10344205 and DE 10344207, the entire contents of each of which are hereby incorporated by reference and are useful to produce the fibers of the current disclosure. Other fiber drawing techniques are suitable as known to those skilled in the art of fiber manufacture.

The compositions of the chalcogenide glass core composition and the cladding composition may be similar. In some embodiments, the compositions are identical except for the amounts of sulfur and/or selenium. Increasing the sulfur and/or selenium content reduces the refractive index and increases the coefficient of thermal expansion.

The disclosure includes chalcogenide glass core compositions comprising a) sulfur and/or selenium, b) germanium, and c) gallium, indium, tin and/or one or more metal halides. The disclosure also includes cladding compositions comprising a) sulfur and/or selenium, b) germanium, and c) gallium, indium, tin and/or one or more metal halides. The metal halides may include without limitation cesium bromide and indium(III) bromide.

Suitable chalcogenide glass core compositions and suitable cladding compositions include those of Formula A and Formula B:

| Formula A Component | Mole % |
| --- | --- |
| S | 50.00-90.00 |
| Ga | 0-25.00 |
| As | 0-40.0 |
| Ge | 0-35.00 |
| $R^1$ (added in the form of $R^1Hal$) | 0-7.25 |
| $R^2$ (added in the form of $R^2Hal$) | 0-13.5 |
| $M^1$ (added in the form of $M^1Hal_2$) | 0-5 |
| $M^2$ (added in the form of $M^2Hal_2$) | 0-7.25 |
| Ln (added in the form of $LnHal_3$) | 0-4 |
| Sum of Ga, As, and Ge | 10.00-42.00 |
| Sum of $R^1$, $R^2$, $M^1$, $M^2$, and Ln | 0-16.00 |
| Sum of Hal | 0-16.00. |

Or

| Formula B Component | Mole % |
| --- | --- |
| Se | 30.00-75.00 |
| Ga | 5.00-30.00 |
| Ge | 0-25.00 |
| $R^1$ (added in the form of $R^1Hal^1$) | 0-25.00 |
| $R^2$ (added in the form of $R^2Hal^1$) | 0-25.00 |
| $M^1$ (added in the form of $M^1Hal^1_2$) | 0-12.50 |
| $M^2$ (added in the form of $M^2Hal^1_2$) | 0-20.00 |
| Ln (added in the form of $LnHal^1_3$) | 0-8.00 |
| Sum of Se, Ga, and Ge | 50.00-93.33 |
| Sum of $R^1$, $R^2$, $M^1$, $M^2$, and Ln | 1.67-25.00 |
| Sum of $Hal^1$ | 0-25.00 | wherein

Hal=fluoride, chloride, bromide, and/or iodide, $Hal^1$=chloride and/or bromide, $R^1$=Li, Na, K, Rb, and/or Cs, $R^2$=Ag and/or Cu, $M^1$=Mg, Ca, Sr, and/or Ba, $M^2$=Zn, Cd, Hg, and/or Pb, Ln=La, Ce, Pr, Nd, Pm, Sm, Eu, Dy, Ho, Er, Tm, Yb, Lu, Y, and Sc; and;

wherein in Formula A and Formula B, some or all of the gallium can be replaced by indium, wherein in Formula A some or all of the arsenic can be replaced by antimony.

Irrespective of Formula A and Formula B, the chalcogenide glass core composition and the cladding composition may each consist essentially of a) 50-90 mol % of sulfur, b) 5-35 mol % of germanium, and c) 1-40 mol % of gallium, indium and/or a metal halide. The chalcogenide glass core composition and the cladding composition may each consist essentially of a) 65-75 mol % of sulfur, b) 15-30 mol % of germanium, and c) 1-10 mol % of gallium. The chalcogenide glass core composition and the cladding composition may each consist essentially of a) 50-60 mol % of sulfur, b) 10-20 mol % of germanium, c) 10-20 mol % of indium, and d) 10-20 mol % of a metal halide.

The chalcogenide glass core composition and the cladding composition may each consist essentially of a) 35-80 mol % of selenium, b) 5-35 mol % of germanium, c) 5-20 mol % of indium, d) 1-10 mol % of tin, and e) 10-20 mol % of one or more metal halides. The chalcogenide glass core composition and the cladding composition may each consist essentially of a) 45-55 mol % of selenium, b) 5-15 mol % of germanium, c) 10-20 mol % of indium, d) 1-10 mol % of tin, and e) 10-20 mol % of one or more metal halides. The chalcogenide glass core composition and the cladding composition each consists essentially of a) 65-75 mol % of selenium, b) 20-30 mol % of germanium, and c) 1-10 mol % of indium.

All of the numerical ranges disclosed herein include all subranges therebetween. For example, the range 50-90 mol % includes 51-90, 50-89, 60-80, and all other numerical possibilities.

The compositions of the chalcogenide glass core composition and the cladding composition may be similar or different. In some embodiments, the compositions are identical except for the amounts of sulfur and/or selenium. The refractive indices for the core and the cladding, as well as the coefficients of thermal expansion for the core and the cladding, can be adjusted by adjusting the content of the sulfur and/or selenium in the chalcogenide glass core composition or the cladding compositions. In some embodiments, the cladding composition has a higher content of sulfur and/or selenium than chalcogenide glass core composition. In other embodiments, the cladding composition has a lower content of sulfur and/or selenium than chalcogenide glass core composition. The variation in the content of sulfur and/or selenium depends on many factors, such as 1) the desired NA, where the amount of sulfur and/or selenium to increase or decrease is guided by the impact on refractive index, 2) the impact of the sulfur and/or selenium content on the CTE of the core and cladding compositions, and 3) the overall optical and mechanical design of the system.

The cladding composition is a polymer in some embodiments, such as for non-limiting example a UV curable acrylate such as PMMA, a silicone, a polyimide, or a mixture thereof. Other known polymers and mixtures thereof can be used as the cladding. The polymer cladding can be used to form a fiber with the chalcogenide glass core compositions described herein.

The chalcogenide glass core and the cladding in some embodiments transmit at least 75% of incident light at wavelengths from 500 nm to 11,000 nm, at least 70% of incident light at wavelengths from 650 nm to 12,000 nm, and at least 70% of incident light at wavelengths from 500 nm 14,000 nm. The chalcogenide glass core and the cladding in some embodiments exhibit an extinction coefficient of <0.1 $cm^{-1}$ at wavelengths from 500 nm to 11,000 nm, from 650 nm to 12,000 nm or from 500 nm 14,000 nm.

The water and oxygen contaminant levels should be controlled to achieve a low attenuation in a manner known to those skilled in the art. Similarly, it is known that the purity of the raw materials affects crystallization and attenuation. Still further, it is known that the do/dT should be low to minimize the runaway effect.

For both the sulfur based compositions and the selenium based compositions, the properties of most interest, in addition to good chemical and mechanical durability and desired light transmission, are index dispersion, coefficient of thermal expansion, and thermal dependency of refractive index.

The index dispersion is preferably as low as possible. The amount of index dispersion is measured as the Abbe number in the visible, $V_d$, which is calculated as $V_d=(n_d-1)/(n_F-n_C)$ where $n_d$, $n_F$ and $n_C$ are the refractive indices of the material at the d line, F line, and C line (F line: 486.13 nm, d line: 587.56 nm, C line: 656.27 nm). Abbe number in the mid-IR range (3-5 µm) is generally calculated using the index at 3,000, 4,000, and 5,000 nm while the Abbe number in the long-wave range (8-12 µm) may be calculated using the index at 8,000, 10,000 and 12,000 nm.

In general, the higher the Abbe No. the lower the index dispersion. The glass compositions according to the disclosure in some embodiments exhibit an Abbe No. in the visible range of at least 15, for example, 20-30, especially greater than 25. In the mid-infrared range, the glasses in some embodiments exhibit an Abbe No. of at least 100, for example, 100-300, especially at least 180, particularly greater than 200. In the far-infrared range, the glasses in some embodiments exhibit an Abbe No. of at least 60, for example, 60-185, especially at least 100, particularly greater than 120.

Similarly, the coefficient of thermal expansion, a, in some embodiments is preferred to be as low as possible for the glass compositions according to the disclosure. Thus, the glasses according to the disclosure in some embodiments have a coefficient of thermal expansion that is less than $50 \times 10^{-6}/K$ or example, $15 \times 10^{-6}/K$-$25 \times 10^{-6}/K$. In some embodiments, the core composition has a refractive index of 2.7782 at 10 µm and a CTE of $20.8 \times 10^{-6}/K$ at 10.6 µm and the cladding composition has a refractive index of 2.775 at 10 µm and a CTE of $19.5 \times 10^{-6}/K$ at 10.6 µm The thermal dependency of the refractive index, measured as dn/dT (the temperature coefficient of the refractive index), is low in some embodiments. Thus, the glasses according to the disclosure in some embodiments have a dn/dT value of less than $30 \times 10^{-6}/K$, for example, $5 \times 10^{-6}/K$-$30 \times 10^{-6}/K$.

The selection of halide compounds can affect the critical cooling rate of the glass composition. For example, the halides $M^2Hal_2$ ($M^2$=Zn, Cd, or Pb) and $R^2Hal$ ($R^2$=Ag or Cu) produce glass at lower cooling rates while glass made with the halides $R^1Hal$ ($R^1$=Li, Na, K, Rb, or Cs) and $M^1Hal_2$ ($M^1$=Mg, Ca, Sr, or Ba) tend to require more rapid cooling. At a given cooling rate, a higher total halogen content may be achieved using $M^2Hal_2$ and $R^2Hal$ halides, as compared to $R^1Hal$ and $M^1Hal_2$.

The addition of chlorine modifies the visible transmission and thereby the short wavelength dispersion which are linked though the Kramers-Kronig relation. The addition of Br has a somewhat larger effect than Cl on increasing thermal expansion and thereby reducing dn/dT which is linked through the Lorenz-Lorentz relation. Br has an impact on increasing IR transmission but a lower impact on increasing visible/NIR transmission relative to Cl. The identity of the alkali elements also impacts thermal expansion. Larger alkali ions (such as Cs) will generally tend to increase thermal expansion compared to smaller ions (such as Li). On the other hand, the identity of the alkali element will have very little effect on the transmission or dispersion.

The glasses of the present disclosure may be used for non-limiting example to produce optical fibers. The fibers may be used for non-limiting example in medical applications for laser and endoscoping surgery and dermatology, in industrial applications for laser-based processing of materials, in automotive applications for optical data delivery, in medical and industrial applications for laser-based imaging systems, and in military and civilian applications for night vision systems.

For medical applications in particular, the fibers of the disclosure can transmit IR radiation at, for example, 2.94 μm by using an Er:YAG laser, at 5.5 μm by using a CO laser, or at 9 to 11 μm by using a $CO_2$ laser (main radiation at 10.6 μm).

For industrial applications, the fibers of the disclosure can transmit IR radiation at, for example, 2 to 11 μm for pyrometers and other devices, where the lenses and the fibers can be made from the chalcogenide glass according the disclosure.

For thermal visioning, the fibers of the disclosure can detect objects (e.g. missile defense) and can be used in small systems.

EXAMPLES

Without further elaboration, it is believed that one skilled in the art can, using the preceding description, utilize the present disclosure to its fullest extent. The following embodiments are to be construed as merely illustrative, and not limitative of the remainder of the disclosure in any way whatsoever.

Tables 1A, 1B, 1C, 1D, 1E, and 1F list examples of the glass composition according to the disclosure. Tables 1A-1D list examples of the sulfur based glass compositions and Tables 1E-1F list examples of the selenium based glass compositions.

TABLE 1A

Examples of Sulfur Based Glass Compositions (mol %) according to the Disclosure

| Component Content (mol %) | Examples | | | | | | |
|---|---|---|---|---|---|---|---|
| | 1 | 2 | 3 | 4 | 5 | 6 | 7 |
| S | 60 | 60 | 60 | 65 | 58 | 65 | 70 |
| Ge | | 5 | 10 | 10 | 20 | 25 | 23 |
| Ga | | | | | | | |
| As | 40 | 35 | 30 | 25 | 12 | 10 | 7 |
| Total | 100 | 100 | 100 | 100 | 100 | 100 | 100 |

TABLE 1B

Further Examples of Sulfur Based Glass Compositions (mol %) according to the Disclosure

| Component Content (mol %) | Examples | | | |
|---|---|---|---|---|
| | 8 | 9 | 10 | 11 |
| S | 70 | 70 | 75 | 70 |
| Ge | 25 | 20 | 20 | 23 |
| Ga | 5 | 10 | 5 | 7 |
| As | | | | |
| Total | 100 | 100 | 100 | 100 |

TABLE 1C

Examples of Selenium Based Glass Compositions (mol %) according to the Disclosure

| Component Content (mol %) | Examples | | | | | | | |
|---|---|---|---|---|---|---|---|---|
| | 12 | 13 | 14 | 15 | 16 | 17 | 18 | 19 |
| Se | 37 | 37 | 52.5 | 54.2 | 55.6 | 52.5 | 54.2 | 55.6 |
| Ga | 21 | 21 | 9.5 | 8.3 | 7.4 | 9.5 | 8.3 | 7.4 |
| Ge | | | 19 | 20.9 | 22.2 | 19 | 20.9 | 22.2 |
| Br | | 21 | | | | 9.5 | 8.3 | 7.4 |
| Cl | 21 | | 9.5 | 8.3 | 7.4 | | | |
| Cs, Na, K, Ag | 21 (Cs) | 21 (Cs) | 9.5 (Na) | 8.3 (Na) | 7.4 (Na) | 9.5 (Na) | 8.3 (Na) | 7.4 (Na) |
| Total | 100 | 100 | 100 | 100 | 100 | 100 | 100 | 100 |

TABLE 1D

Examples of Selenium Based Glass Compositions (mol %) according to the Disclosure

| Component Content (mol %) | Examples | | | | | | | |
|---|---|---|---|---|---|---|---|---|
| | 20 | 21 | 22 | 23 | 24 | 25 | 26 | 27 |
| Se | 37 | 37 | 52.5 | 54.2 | 55.6 | 52.5 | 54.2 | 55.6 |
| Ga | 21 | 21 | 9.5 | 8.3 | 7.4 | 9.5 | 8.3 | 7.4 |
| Ge | | | 19 | 20.9 | 22.2 | 19 | 20.9 | 22.2 |
| Br | | 21 | | | | 9.5 | 8.3 | 7.4 |
| Cl | 21 | | 9.5 | 8.3 | 7.4 | | | |
| Cs, Na, K, Ag | 21 (Ag) | 21 (Ag) | 9.5 (K) | 8.3 (K) | 7.4 (K) | 9.5 (K) | 8.3 (K) | 7.4 (K) |
| Total | 100 | 100 | 100 | 100 | 100 | 100 | 100 | 100 |

TABLE 1E

Further Examples of Selenium Based Glass Compositions (mol %) according to the Disclosure

| Component Content (mol %) | Examples | | | | | |
|---|---|---|---|---|---|---|
| | 28 | 29 | 30 | 31 | 32 | 33 |
| Se | 55 | 65.5 | 57.7 | 55 | 65.5 | 57.7 |
| Ga | 10 | 8.7 | 7.7 | 10 | 8.7 | 7.7 |
| Ge | 20 | 21.8 | 23 | 20 | 21.8 | |
| Br | | | | 10 | 8.7 | 7.7 |
| Cl | 10 | 8.7 | 7.7 | | | |
| Zn | 5 | 4.3 | 3.9 | 5 | 4.3 | 3.9 |
| Total | 100 | 100 | 100 | 100 | 100 | 100 |

TABLE 1F

Further Examples of Selenium Based Glass Compositions (mol %) according to the Disclosure

| Component Content (mol %) | Examples | | | | | |
|---|---|---|---|---|---|---|
| | 34 | 35 | 36 | 37 | 38 | 39 |
| Se | 55 | 65.5 | 57.7 | 55 | 65.5 | 57.7 |
| Ga | 10 | 8.7 | 7.7 | 10 | 8.7 | 7.7 |
| Ge | 20 | 21.8 | 23 | 20 | 21.8 | |

TABLE 1F-continued

Further Examples of Selenium Based Glass Compositions (mol %) according to the Disclosure

| Component Content (mol %) | Examples | | | | | |
|---|---|---|---|---|---|---|
| | 34 | 35 | 36 | 37 | 38 | 39 |
| Br | | | | 10 | 8.7 | 7.7 |
| Cl | 10 | 8.7 | 7.7 | | | |
| Pb | 5 | 4.3 | 3.9 | 5 | 4.3 | 3.9 |
| Total | 100 | 100 | 100 | 100 | 100 | 100 |

The preceding examples can be repeated with similar success by substituting the generically or specifically described reactants and/or operating conditions of this disclosure for those used in the preceding examples. Fibers can be drawn from these compositions using any fiber drawing techniques known to those skilled in the art of fiber manufacture. Furthermore, the content of the sulfur and selenium can be adjusted to modify the refractive indices and the coefficients of thermal expansion to produce the fibers of the current disclosure.

From the foregoing description, one skilled in the art can easily ascertain the essential characteristics of this disclosure and, without departing from the spirit and scope thereof, can make various changes and modifications of the disclosure to adapt it to various usages and conditions.

The invention claimed is:

1. A glass fiber for transmitting infrared radiation, the glass fiber comprising:
   a chalcogenide glass core, the core having a core composition with a refractive index n(core) and a coefficient of thermal expansion CTE(core); and
   a cladding, the cladding having a cladding composition with a refractive index n(cladding) and a coefficient of thermal expansion CTE(cladding),
   wherein n(cladding) is less than n(core),
   and wherein the core composition consists essentially of:
   a) 65-75 mol % of sulfur;
   b) 15-30 mol % of germanium; and
   c) 1-10 mol % gallium.

2. The glass fiber of claim 1, wherein the cladding composition comprises a) sulfur and/or selenium, b) germanium, and c) gallium, indium, tin and/or one or more metal halides.

3. The glass fiber of claim 1, wherein the cladding composition consists essentially of a) 50-90 mol % of sulfur, b) 5-35 mol % of germanium, and c) 1-40 mol % of gallium.

4. The glass fiber of claim 1, wherein the cladding composition consists essentially of a) 65-75 mol % of sulfur, b) 15-30 mol % of germanium, and c) 1-10 mol % of gallium.

5. The glass fiber of claim 1, wherein the cladding composition consists essentially of a) 50-60 mol % of sulfur, b) 10-20 mol % of germanium, c) 10-20 mol % of indium, and d) 10-20 mol % of a metal halide.

6. The glass fiber of claim 1, wherein the cladding composition consists essentially of a) 35-80 mol % of selenium, b) 5-35 mol % of germanium, c) 5-20 mol % of indium, d) 1-10 mol % of tin, and e) 10-20 mol % of one or more metal halides.

7. The glass fiber of claim 1, wherein the cladding composition consists essentially of a) 45-55 mol % of selenium, b) 5-15 mol % of germanium, c) 10-20 mol % of indium, d) 1-10 mol % of tin, and e) 10-20 mol % of one or more metal halides.

8. The glass fiber of claim 1, wherein the cladding composition consists essentially of a) 65-75 mol % of selenium, b) 20-30 mol % of germanium, and c) 1-10 mol % of indium.

9. The glass fiber of claim 1, wherein the cladding composition has a higher content of sulfur than the core composition.

10. The glass fiber of claim 1, wherein the cladding composition has a lower content of sulfur than the core composition.

11. The glass fiber of claim 1, wherein the core composition and the cladding composition have the same composition except for the amount of sulfur.

12. The glass fiber of claim 1, wherein the cladding composition is a polymer.

13. The glass fiber of claim 12, wherein the polymer comprises at least one compound selected from the group consisting of: a UV curable acrylate, a silicone, and a polyimide.

14. The glass fiber of claim 1, wherein the CTE(cladding) is less than the CTE(core).

15. The glass fiber of claim 1, wherein the diameter of the chalcogenide glass core is from 10 μm to 300 μm.

16. The glass fiber of claim 1, wherein the outer diameter of the fiber is from 10.5 μm to 350 μm.

17. The glass fiber of claim 1, wherein the glass fiber is a step index fiber.

* * * * *